US011012155B1

(12) United States Patent
Chaboud et al.

(10) Patent No.: US 11,012,155 B1
(45) Date of Patent: May 18, 2021

(54) SYSTEMS FOR COEXISTENCE OF INFRARED COMMUNICATIONS

(71) Applicant: AMAZON TECHNOLOGIES, INC., Seattle, WA (US)

(72) Inventors: Matthew L. Chaboud, San Francisco, CA (US); Rade Djordjevic, Berlin (DE); Damjan Majstorovic, Berlin (DE); Petar Djekic, Berlin (DE)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/906,380

(22) Filed: Jun. 19, 2020

(51) Int. Cl.
| | | |
|---|---|---|
| *H04B 10/114* | (2013.01) | |
| *H04B 10/29* | (2013.01) | |
| *H04B 10/67* | (2013.01) | |
| *H04B 10/69* | (2013.01) | |

(52) U.S. Cl.
CPC ......... *H04B 10/1141* (2013.01); *H04B 10/29* (2013.01); *H04B 10/671* (2013.01); *H04B 10/695* (2013.01)

(58) Field of Classification Search
CPC ............ H04B 10/11–116; H04B 10/29; H04B 10/1141; H04B 10/695; H04B 10/671
See application file for complete search history.

(56) References Cited

U.S. PATENT DOCUMENTS

| | | | | |
|---|---|---|---|---|
| 6,769,129 B1* | 7/2004 | Perlman | ............... | H04N 5/4403 725/80 |
| 2006/0210278 A1* | 9/2006 | Cregg | ................ | H04B 10/1121 398/107 |
| 2008/0316046 A1* | 12/2008 | Walrant | ................ | G08C 17/02 340/12.22 |
| 2012/0256735 A1* | 10/2012 | Gilson | ................... | G08C 19/16 340/12.17 |
| 2014/0286641 A1* | 9/2014 | Yee | ........................ | G08C 23/04 398/107 |

* cited by examiner

*Primary Examiner* — Casey L Kretzer
(74) *Attorney, Agent, or Firm* — Lindauer Law, PLLC

(57) ABSTRACT

In a system that reduces interference between devices that transmit infrared signals, a first device transmits a first infrared signal to a second device during a first time period. The second device determines a command encoded by the first infrared signal. When the first time period has elapsed, the first device ceases transmission during a second time period. The second device transmits the second infrared signal to a third device during the second time period. As a result, transmissions from the second device to a third device are not affected by interference from transmissions by the first device. Selected signals from the first device may be permitted during the second time period, such as signals to cancel previous commands or to queue additional commands.

20 Claims, 9 Drawing Sheets

SYSTEMS FOR COEXISTENCE OF INFRARED COMMUNICATIONS

BACKGROUND

Numerous types of devices, such as televisions, cable boxes, set top boxes, sound bars and other audio components, and so forth may be controlled using infrared signals, such as signals transmitted by a remote control device. When multiple devices simultaneously transmit infrared signals, the signals may interfere with one another. This interference may hinder reception of infrared signals by devices and may cause it to be impractical for certain devices to be controlled using infrared signals.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1A:
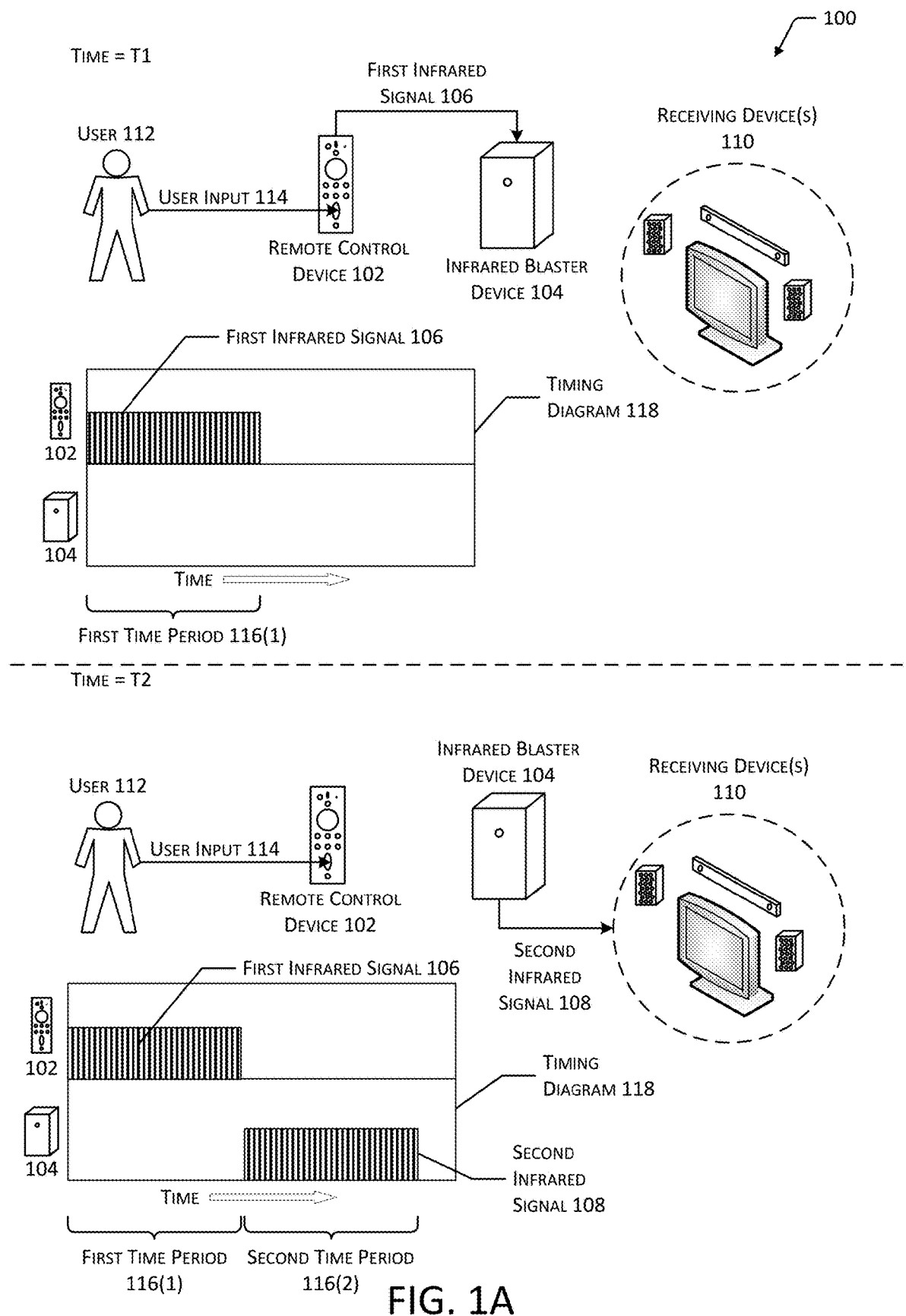
FIG. 1A depicts an implementation of a system for reducing interference between multiple infrared devices.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Infrared signals may be used to enable remote control of many types of devices. For example, televisions, computers, cable boxes, sound bars and other audio devices, and so forth may be controlled using infrared signals. Continuing the example, a remote control device may be configured to receive a user input, such as actuation of a button, and may transmit an infrared signal indicative of the button that was actuated to a television. The television may receive and process the infrared signal, then perform a function associated with the button that was actuated. Infrared remote control devices may be produced more rapidly and inexpensively and used more easily than control devices that use other communication channels, such as Bluetooth or Wi-Fi. Additionally, use of infrared remote control devices avoids interference with Bluetooth and Wi-Fi signals transmitted by other devices in an environment. Some types of infrared devices, referred to as "infrared blasters," may be used to control other devices by emulating an infrared remote control device. For example, a smart television may be equipped with an infrared blaster such that a remote control device for the television may be used to cause the television to in turn transmit infrared signals to other devices, such as a sound bar or other audio devices. Use of an infrared blaster device may therefore allow one or more other devices to be controlled using a single remote control device that transmits signals to the infrared blaster device, which in turn transmits infrared signals to the devices to be controlled.

Protocols for consumer infrared devices are generally not standardized, and numerous infrared devices may operate using different protocols. When multiple infrared signals within an environment are transmitted simultaneously, this may result in interference between the signals, preventing proper reception and processing of the signals. This type of interference may prevent use of infrared signals to control infrared blaster devices, resulting in most infrared blaster devices instead being controlled using Bluetooth or Wi-Fi signals. Use of different mediums to control infrared blaster devices may increase the manufacturing cost and complexity of such systems and require a user to be familiar regarding setup and use of different types of communication signals to utilize such systems.

Described in this disclosure are techniques for enabling a remote control device to control an infrared blaster device using infrared signals. A first device, such as a remote control device, may receive an input. An input may include actuation of a button or another type of control on the remote control device. For example, a user may press and hold a button on a remote control device to continuously increase or decrease the volume of sound emitted by a television until a desired volume level is reached. In response to the input, the remote control device may transmit a first infrared signal for receipt by a second device, such as an infrared blaster device. The remote control device may be configured to transmit the first infrared signal for a first time period. After the first time period has elapsed, the remote control device may withhold transmission of one or more infrared signals for a second time period. Withholding of the infrared signal(s) may include preventing transmission of signals that indicate a received input during the second time period or delaying transmission of infrared signals until the second time period has elapsed.

The infrared blaster device may determine one or more characteristics of the first infrared signal or data encoded by the signal, which may be used to determine the source of the signal, qualities of the signal such as a frequency or pulse width, or commands encoded by the signal. Based on at least a portion of the first infrared signal, the infrared blaster device may determine the duration of the first time period. For example, the infrared blaster device may access time data that associates the duration of the first time period with an identifier of the remote control device or of the device type associated with the remote control device. As another example, the time data may associate the duration of the first time period with a particular frequency or other characteristic of the first infrared signal. In other implementations, the first infrared signal may encode data indicative of the duration of the first time period or data indicating that transmission of the first infrared signal has ceased. Based on this information, the infrared blaster device may determine when the first time period will lapse. In other implementations, the infrared blaster device may determine that the first time period has elapsed based on a lack of received signals from the remote control device for at least a threshold length of time.

In response to determining that the first time period has elapsed, the infrared blaster device may transmit a second infrared signal to one or more other devices during the second time period that follows the first time period. For example, other devices may be controlled using the second infrared signal, such as televisions, audio devices, and so forth. Because the remote control device is not transmitting during the second time period, signals from the remote control device may not interfere with signals from the infrared blaster device.

In some implementations, the techniques described above may be used in response to particular types of inputs, while other techniques may be used in response to other inputs. For example, in response to actuation of controls that may receive a continuous or repeated input, such as a volume or channel control for a television, the remote control device may be configured to transmit an infrared signal during the first time period and cease transmitting the infrared signal during the second time period. However, in response to actuation of other controls, such as buttons that are typically actuated using a single keypress, then released, the remote control device may transmit signals without necessarily utilizing the techniques described above. The techniques described above may be used independent of the particular infrared protocol or standard used to transmit signals during the first time period. For example, the duration of the second time period during which transmission by the remote control device does not occur may be selected based on the time associated with transmission of signals by the second device, independent of the manner in which signals are exchanged or any periods of non-transmission that occur during the first time period as part of the protocol associated with the remote control device.

In some implementations, the remote control device may be configured to transmit infrared signals associated with certain inputs during the second time period while preventing transmission of other infrared signals. For example, certain inputs may correspond to commands used to cancel or modify previous commands that have been sent to the infrared blaster device. Continuing the example, a user may press and hold a first button on a remote control device to increment the channel of an external tuner for a television, then release the first button and press a second button during the second time period to decrement the channel during the second length of time. As another example, a user may rapidly press a series of directional inputs using the directional buttons of a remote control device, and one or more of the button presses may occur during the second time period that occurs after pressing a first directional input button. In such cases, the remote control device may determine that an input received during the second time period is a particular type of input for which a signal may be transmitted during the second time period. The infrared blaster device may be configured to determine the signal received from the remote control device by filtering at least a portion of the signals transmitted by the infrared blaster device during the second time period. For example, if the infrared blaster device receives a signal from the remote control device while transmitting a signal, the infrared blaster device may account for the noise or interference associated with the signal being transmitted to enable the signal from the remote control device to be received and processed. Based on the signal from the remote control device, the infrared blaster device may modify a subsequent output or add an output associated with the received signal to a queue.

After the second time period has elapsed, the remote control device may resume transmitting infrared signals. For example, if a user continues to actuate a button throughout the second time period, the remote control device may transmit a subsequent infrared signal to the infrared blaster device indicative of the actuated button, such as a repeat code indicative of a continued button press. As another example, if a user has actuated other buttons during the second time period, the remote control device may add an indication of one or more of the actuated buttons to a queue and may transmit one or more subsequent signals to the infrared blaster device after the lapse of the second time period. If the infrared blaster device does not receive a subsequent infrared signal from the remote control device after the second time period has elapsed, for at least a threshold length of time, the infrared blaster device may cease transmitting signals to other devices, and in some cases may transmit a signal indicative of release of a previous button or other control associated with the remote control device.

Illustrative System

FIG. 1A depicts an implementation of a system 100 for reducing interference between multiple devices that use infrared signals to communicate. In some implementations, the infrared signals may include electromagnetic signals having wavelengths ranging from 700 nanometers (nm) to 1000 nm. In other implementations, the infrared signals may use the near-infrared region of the electromagnetic spectrum, such as signals having a wavelength ranging from 750 nm to 2500 nm. Additionally, while implementations described herein reference the transmission and receipt of infrared signals, the techniques described in this disclosure may be used with other types of signals. For example, acoustic signals, electromagnetic signals at wavelengths other than the infrared region of the electromagnetic spectrum, and so forth, may interfere with one another if multiple signals are simultaneously transmitted by multiple devices. Use of the techniques described herein may reduce interference associated with simultaneous transmission of signals by both a sending and receiving device independent of the type of signal.

FIG. 1A depicts an environment that includes a remote control device 102 that is used to control an infrared blaster device 104 using a first infrared signal 106. The infrared blaster device 104 may in turn determine a second infrared signal 108 based on the received first infrared signal 106 and transmit the second infrared signal 108 to one or more receiving devices 110.

For example, at a first time T1, a user 112 may provide a user input 114 to the remote control device 102, such as by actuating one or more buttons or other controls of the remote control device 102. In some implementations, the remote control device 102 may be configured to receive different types of user input 114. For example, a remote control device 102 may perform the techniques described herein in response to actuation of certain buttons while performing other techniques in response to actuation of other buttons. As another example, a remote control device 102 may perform the techniques described herein in response to a user input 114 that includes continuously depressing a button, pressing a button repeatedly, or otherwise continuously or repeatedly actuating a control, while other techniques may be performed in response to a single discrete actuation and release of a button or other control. In some implementations, the remote control device 102 may include one or more processors, microcontrollers, systems-on-a-chip (SoC), and so forth that may determine whether a particular user input 114 is associated with the techniques described herein. For example, data stored in association with the remote control device 102 may associate particular inputs, types of inputs, or characteristics of inputs with one or more functions to be performed by the remote control device 102. Continuing the example, FIG. 1A depicts the remote control device 102 transmitting a first infrared signal 106 indicative of the user input 114 to the infrared blaster device 104 during a first time period 116(1). During the first time period 116(1), the infrared blaster device 104 may receive the first infrared signal 106 and may refrain from transmitting other infrared signals. The first infrared signal 106 may include data indicative of the remote control device 102, data indicative of the user input 114, and in some implementations, data indicative of one or more functions to be performed by the remote control device 102. For example, the first infrared signal 106 may include an indication of one or more time periods 116 during which the remote control device 102 will transmit or refrain from transmitting infrared signals.

In response to the user input 114, the remote control device 102 may be configured to transmit the first infrared signal 106 for the first time period 116(1), then cease transmitting the first infrared signal 106 after the first time period 116(1) has elapsed. During a second time period 116(2) that follows the first time period 116(1), the remote control device 102 may prevent transmission of one or more infrared signals. For example, if a subsequent user input 114 is determined during the second time period 116(2), the remote control device 102 may refrain from transmitting a subsequent infrared signal until the second time period 116(2) has elapsed, such as by adding an indication of the subsequent infrared signal to a queue. As shown in the timing diagram 118 at the first time T1, the remote control device 102 may transmit one or more infrared signals during the first time period 116(1).

At a second time T2 subsequent to the first time T1, in response to receiving the first infrared signal 106, the infrared blaster device 104 may transmit a second infrared signal 108 to one or more receiving devices 110 during the second time period 116(2). For example, commands associated with the user input 114 to the remote control device 102 may be encoded in the first infrared signal 106 and provided to the infrared blaster device 104, which may in turn provide a second infrared signal 108 to cause one or more of the receiving devices 110 to perform a function associated with the user input 114. Continuing the example, actuation of a button on the remote control device 102 associated with volume control may ultimately cause a television, sound bar, or other type of audio device to change the volume of sound that is output in response to the second infrared signal 108 from the infrared blaster device 104.

In some implementations, when the infrared blaster device 104 receives the first infrared signal 106, one or more characteristics of the first infrared signal 106 or data encoded in the first infrared signal 106 may be used to determine data to encode in the second infrared signal 108 and a time at which to transmit the second infrared signal 108. For example, the infrared blaster device 104 may be programmed to control or otherwise interact with particular receiving devices 110. In response to a command encoded by the first infrared signal 106, the infrared blaster device 104 may determine a particular receiving device 110 to receive a corresponding command and a protocol or standard for encoding the corresponding command in the second infrared signal 108 for receipt by the particular receiving device 110. Based on the characteristics or data encoded in the first infrared signal 106, the infrared blaster device 104 may also determine when the second time period 116(2) during which the remote control device 102 will not transmit infrared signals will occur. In some implementations, the infrared blaster device 104 may access data that associates particular characteristics of infrared signals, such as a source of the signal, a frequency of the signal, the command encoded in the signal, or other data encoded in the signal with an indication of the first time period 116(1), a duration of the first time period 116(1), or a particular time that the first time period 116(1) will lapse. In other implementations, the first infrared signal 106 may encode data indicating the time that the first time period 116(1) will lapse. For example, the remote control device 102 may be configured to transmit the first infrared signal 106 for a first length of time based on the particular command associated with the user input 114, and cease transmitting infrared signals for a second length of time based on the particular command. Based on the command associated with the user input 114, the remote control device 102 may include data indicative of the first time period 116(1) in the first infrared signal 106, or the infrared blaster device 104 may determine the command encoded in the first infrared signal 106 and access data that associates the first time period 116(1) with the command. In still other implementations, the first infrared signal 106 may include an indication that transmission of the first infrared signal 106 is completed or has ceased, and the infrared blaster device 104 may transmit the second infrared signal 108 in response to this indication. In other implementations, the infrared blaster device 104 may determine that the remote control device 102 has ceased transmitting the first infrared signal 106 for at least a threshold length of time and may transmit the second infrared signal 108 in response to this determination.

As shown in FIG. 1A, by causing the remote control device 102 to cease transmission of the first infrared signal 106 after the first time period 116(1) has elapsed, and causing the infrared blaster device 104 to transmit the second infrared signal 108 during a second time period 116(2) after the first time period 116(1), the remote control device 102 and infrared blaster device 104 may be prevented from transmitting infrared signals at the same time. As shown in the timing diagram 118 at the second time T2, the remote control device 102 transmits infrared signals during the first time period 116(1) while the infrared blaster device 104 does not transmit infrared signals. During the second time period 116(2), the infrared blaster device 104 transmits infrared signals while the remote control device 102 does not transmit infrared signals. As a result, possible interference between the first infrared signal 106 and the second infrared signal 108 may be avoided.

Figure 1B:
FIG. 1B is a timing diagram depicting an implementation of transmission of infrared signals by a first device and a second device.

FIG. 1B is a timing diagram 118 depicting an implementation of transmission of infrared signals by a first device and a second device. As described with regard to FIG. 1A, in response to a user input 114, such as a user 112 pressing and holding a volume control or other button on a remote control device 102, the remote control device 102 may transmit a first infrared signal 106 during a first time period 116(1). In some cases, the remote control device 102 may be configured to transmit subsequent infrared signals indicative of a button that is continuously pressed, such as a repeat code. For example, an infrared signal that encodes a repeat code may be shorter in duration than the first infrared signal 106 and may be transmitted during a time period subsequent to the second time period 116(2). Continuing the example, FIG. 1B depicts the remote control device 102 transmitting a third infrared signal 120 during a third time period 116(3) after the second time period 116(2). The third infrared signal 120 is depicted having a shorter duration than the first infrared signal 106. The remote control device 102 may cease transmitting the third infrared signal 120 during a fourth time period 116(4) subsequent to the third time period 116(3). During the fourth time period 116,(4), the infrared blaster device 104 may transmit a fourth infrared signal 122 to one or more receiving devices 110 indicative of the continued actuation of a button or other control indicated by the third infrared signal 120. The remote control device 102 may continue to transmit subsequent infrared signals while the button or other control is actuated. For example, FIG. 1B depicts the remote control device 102 transmitting a fifth infrared signal 124 during a fifth time period 116(5) that follows the fourth time period 116(4). The infrared blaster device 104 may transmit a sixth infrared signal 126 during a sixth time period 116(6) subsequent to the fifth time period 116(5). FIG. 1B depicts a seventh time period 116(7) subsequent to the sixth time period 116(6) during which a user input 114 is not received by the remote control device 102. For example, a user 112 may cease holding a button or other control on the remote control device 102. During the seventh time period 116(7), transmission of infrared signals by the remote control device 102 may cease. Transmission of infrared signals by the infrared blaster device 104 may also cease due to the lack of receipt of signals from the remote control device 102.

Figure 2:
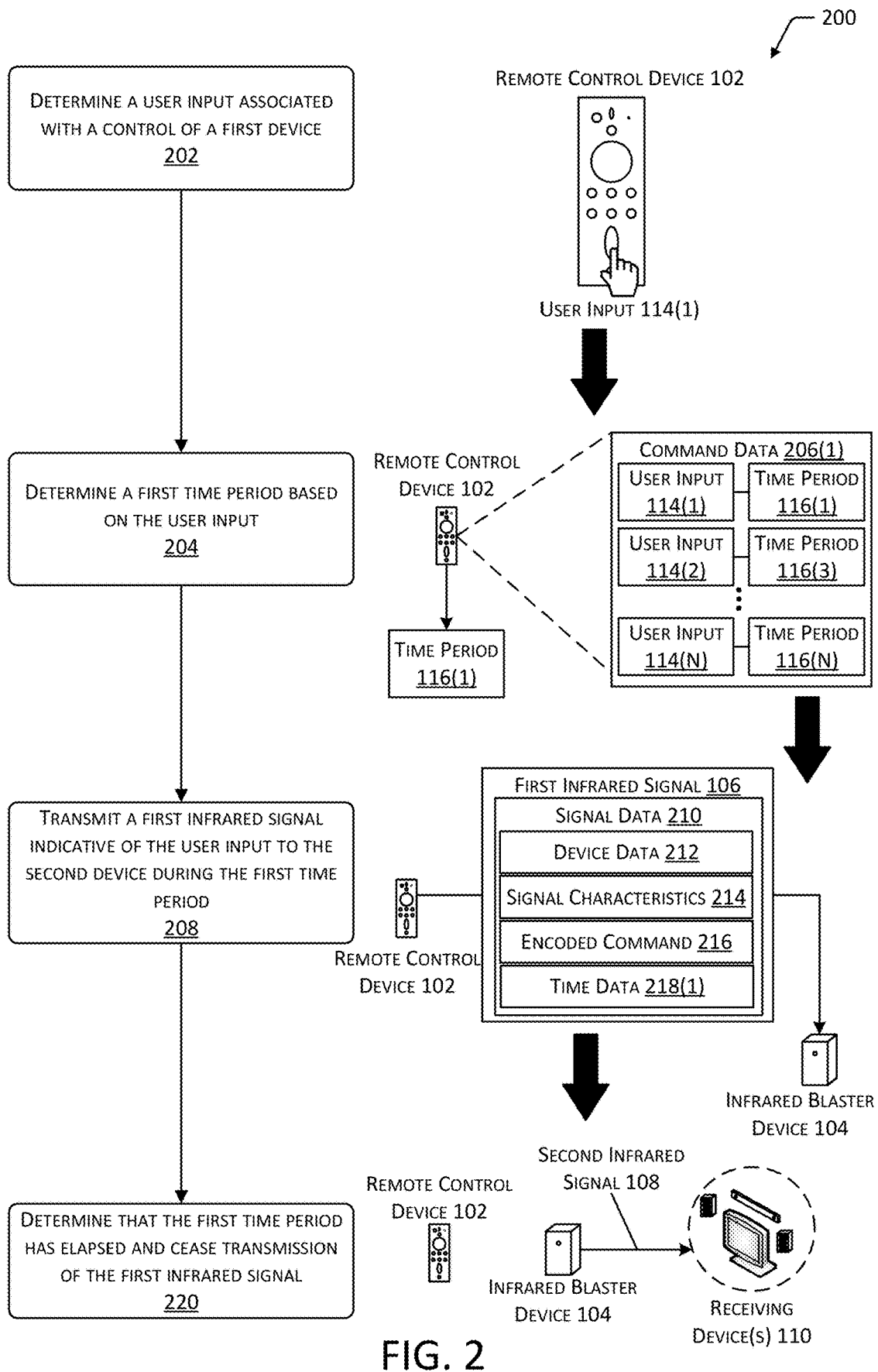
FIG. 2 is a scenario illustrating a method for controlling transmission of infrared signals by a first device to reduce interference to infrared signals transmitted by a second device.

FIG. 2 is a scenario 200 illustrating a method for controlling transmission of infrared signals by a first device to reduce interference to infrared signals transmitted by a second device. In some implementations, the first device may include a remote control device 102 that transmits infrared signals to control a second device, such as an infrared blaster device 104. The infrared blaster device 104 may, in turn, transmit infrared signals to other devices, such as receiving devices 110. Preventing simultaneous transmission of infrared signals by the first device and second device may reduce interference to the signals.

At 202 a user input 114(1) associated with a control of a first device may be determined. For example, a remote control device 102 may include one or more buttons or other types of controls. The user input 114(1) may include actuation of a single button, multiple buttons simultaneously, multiple buttons in succession, and so forth. In some cases, the user input 114 may include different types of actuation, such as pressing then releasing a button, pressing and holding a button, or pressing a button multiple times in succession.

At 204, a first time period 116(1) may be determined based on the user input 114(1). For example, the remote control device 102 may access command data 206(1) that associates different user inputs 114 with corresponding time periods 116. Continuing the example, a first user input 114(1) may result in transmission of an infrared signal for a time period 116(1) having a first duration, while a second user input 114(2) may result in transmission of an infrared signal for a time period 116(3) having a different duration. The user inputs 114 of the command data 206(1) may include specific controls that are actuated, as well as the manner in which the controls are actuated, such as whether a button is pressed a single time, held for a short duration, held for a long duration, pressed multiple times in succession, and so forth. For example, the first user input 114(1) may include pressing and holding of a volume button on the remote control device 102, while the second user input 114(2) may include pressing a directional button several times in succession. The time periods 116 indicated in the command data 206(1) may include a duration of a length of time, a specific time when a time period 116 begins and ends, or other data indicative of a beginning, end, or duration of the time periods 116.

While FIG. 2 depicts the command data 206(1) associating a first user input 114(1) with a first time period 116(1) and a second user input 114(2) with a third time period 116(3), any number of user inputs 114(N) may be associated with any number of time periods 116(N). Additionally, while FIG. 2 depicts a one-to-one association between each user input 114 and time period 116, in other implementations, a single time period 116 may correspond to multiple user inputs 114. Additionally, while FIG. 2 depicts the command data 206(1) being accessed by the remote control device 102, in other implementations, an indication of the user input 114(1) may be transmitted to another computing device for determination of the associated time period 116(1), and a command or other data may be provided to the remote control device 102 from the separate computing device to cause transmission of an infrared signal for the associated time period 116(1). In some implementations, a default time period 116 may be used in response to user inputs 114 for which another time period 116 is not indicated in the command data 206(1). In other implementations, a single time period 116 may be used in response to all user inputs 114.

At 208, a first infrared signal 106 indicative of the user input 114(1) may be transmitted to a second device during the first time period 116(1). For example, the remote control device 102 may encode a command associated with the user input 114(1) in the first infrared signal 106 and transmit the first infrared signal 106 to an infrared blaster device 104 to cause the infrared blaster device 104 to perform a function.

The first infrared signal 106 may include signal data 210 indicative of characteristics of the first infrared signal 106 or data encoded by the first infrared signal 106. In some implementations, the first infrared signal 106 may encode device data 212. Device data 212 may include data indicative of a source of the first infrared signal 106, such as an identifier associated with the remote control device 102, data indicative of a device type associated with the remote control device 102, or data that indicates one or more other characteristics or components of the remote control device 102. In some cases, the device data 212 may be used by the infrared blaster device 104 to determine a subsequent function for performance. For example, an infrared blaster device 104 may be configured to receive signals from multiple devices and the types of signals output and the times that the signals are output may be determined based in part on the device data 212. Continuing the example, if the remote control device 102 is configured to prevent transmission of infrared signals for sixty milliseconds after the first time period 116(1) has elapsed, the infrared blaster device 104 may be configured to transmit infrared signals for sixty milliseconds or less in response to determining the source of the first infrared signal 106 based on the device data 212.

The first infrared signal 106 may have one or more signal characteristics 214. Signal characteristics 214 may include a frequency, pulse width, duration, or other detectable qualities of the first infrared signal 106. For example, the remote control device 102 may be configured to emit infrared signals having a certain frequency. Based on the frequency of the first infrared signal 106 received by the infrared blaster device 104, the source of the first infrared signal 106 or an associated time period 116 may be determined by the infrared blaster device 104.

The first infrared signal 106 may also include data indicative of an encoded command 216. In other cases, the first infrared signal 106 may encode a message or another type of payload or an encoded indication of the user input 114(1). For example, the infrared blaster device 104 that receives the first infrared signal 106 may determine a time period 116 that is associated with the encoded command 216. Continuing the example, in response to a certain type of user input 114, the remote control device 102 may be configured to withhold transmission of subsequent infrared signals for 60 milliseconds. The duration of this time period 116 may correspond to the duration for transmission of a second infrared signal 108 from the infrared blaster device 104 to one or more other devices. As such, based on the determined encoded command 216, the infrared blaster device 104 may determine an associated time period 116 or an associated function to perform.

In some implementations, the first infrared signal 106 may encode time data 218(1) indicative of the first time period 116(1). For example, the time data 218(1) may indicate a duration of the first time period 116(1), a time at which the first time period 116(1) will elapse, a time at which the first time period 116(1) began, and so forth. Based on the time data 218(1), the infrared blaster device 104 may determine one or more times at which to transmit other infrared signals, a duration for transmission of the infrared signals, and so forth.

At 220, it may be determined that the first time period 116(1) has elapsed, and transmission of the first infrared signal 106 may be ceased. For example, the remote control device 102 may include a clock, microcontroller, or other component that may determine a current time, a length of time that the first infrared signal 106 was transmitted, and so forth. As another example, one or more other computing devices may provide a command or other data to the remote control device 102 at the end of the first time period 116(1) to cause the remote control device 102 to cease transmission. In some implementations, in addition to ceasing transmission of the first infrared signal 106, the remote control device 102 may be prevented from transmission of one or more other infrared signals. After the first time period 116(1) has elapsed, the infrared blaster device 104 may transmit a second infrared signal 108 to one or more receiving devices 110 during a second time period 116(2) that occurs after the first time period 116(1). After the second time period 116(2) has elapsed, the remote control device 102 may resume transmission of infrared signals to the infrared blaster device 104 in response to subsequent user inputs 114. For example, if the user input 114(1) includes a continued press of a button or other control, a subsequent infrared signal transmitted by the remote control device 102 may encode data indicative of a repeated encoded command 216, as discussed with regard to FIG. 1B.

Figure 3:
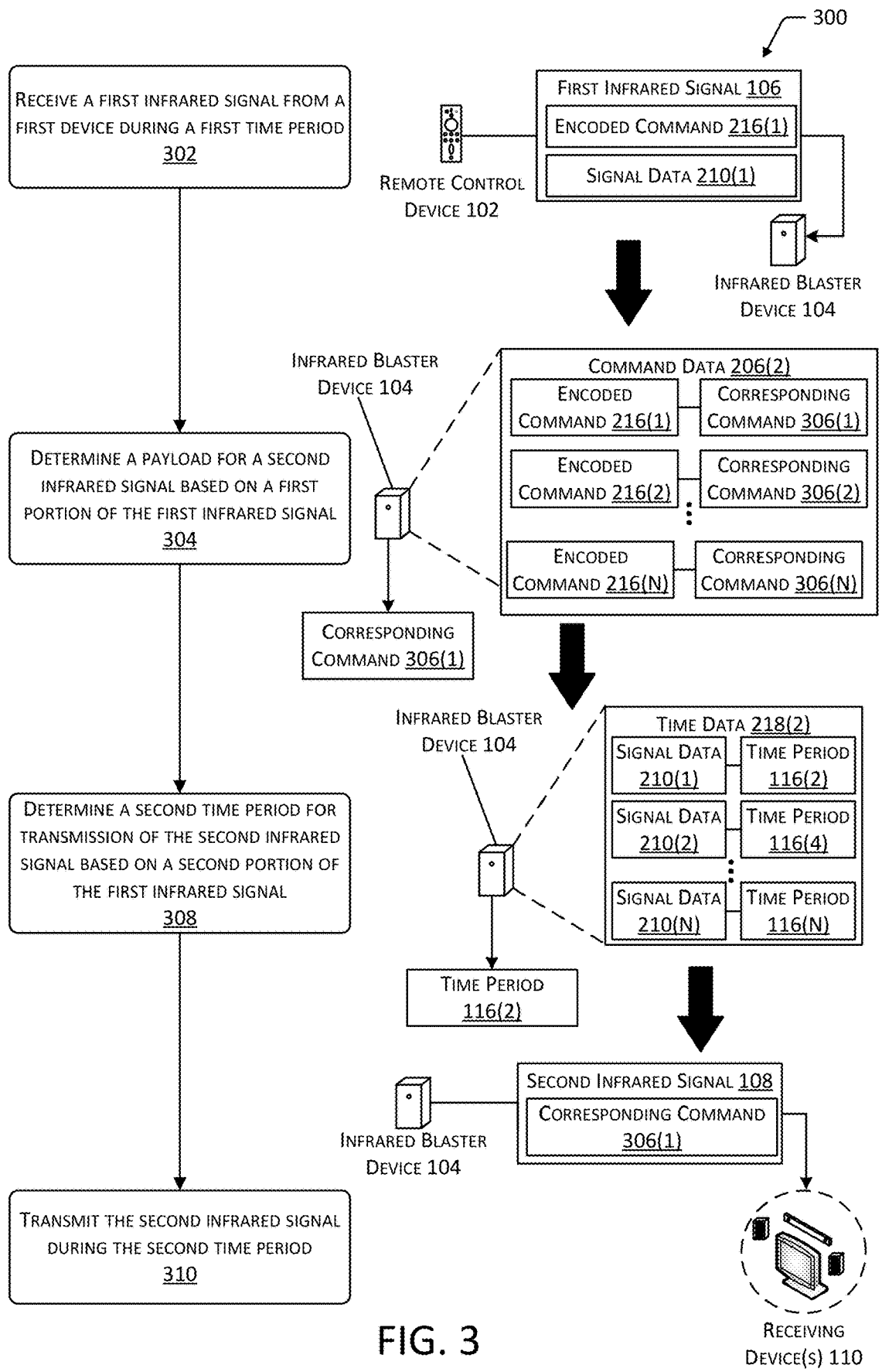
FIG. 3 is a scenario illustrating a method for controlling transmission of infrared signals by a second device to reduce interference from infrared signals transmitted to the second device by a first device.

FIG. 3 is a scenario 300 illustrating a method for controlling transmission of infrared signals by a second device to reduce interference from infrared signals transmitted to the second device by a first device. As described with regard to FIGS. 1A, 1B, and 2, a first device, such as a remote control device 102, may transmit a first infrared signal 106 to a second device, such as an infrared blaster device 104, during a first time period 116(1). The second device may then be configured to transmit a second infrared signal 108 to one or more other devices during a second time period 116(2) after the first time 116(1) has elapsed. At 302, a first infrared signal 106 may be received from a first device during a first time period 116(1). For example, FIG. 3 depicts an infrared blaster device 104 receiving the first infrared signal 106 from a remote control device 102. The first infrared signal 106 may include data indicative of an encoded command 216(1), which may be determined by the remote control device 102 in response to a user input 114, such as actuation of one or more buttons or other controls. The first infrared signal 106 may also include signal data 210(1), which may include one or more of the device data 212, signal characteristics 214, or time data 218 described with regard to FIG. 2. For example, signal data 210(1) may include data encoded within the first infrared signal 106 that indicates a source or other characteristics of the first infrared signal 106, the encoded command 216(1), or one or more times associated with the first time period 116(1). Signal data 210(1) may also include signal characteristics 214 of the first infrared signal 106, such as a frequency, pulse width, and so forth. For example, the infrared blaster device 104 may determine a second infrared signal 108 to be transmitted to a receiving device 110, or a time period 116 for transmission of the second infrared signal 108, based at least in part on one or more of the encoded command 216(1) or other signal data 210(1).

At 304, a payload for a second infrared signal 108 may be determined based on a first portion of the first infrared signal 106. In some implementations, a payload may include a command to be provided to a receiving device 110 or another type of device. For example, in response to an encoded command 216(1) determined from a first infrared signal 106 from a remote control device 102, an infrared blaster device 104 may provide a second infrared signal 108 that encodes a corresponding command 306(1) to a receiving device 110 to cause the receiving device 110 to perform a function. In other implementations, the payload may include a message or other data to be provided to a device in addition to or in place of a command.

For example, FIG. 3 depicts the infrared blaster device 104 accessing command data 206(2) that associates encoded commands 216 with corresponding commands 306. Continuing the example, the first infrared signal 106 may indicate an encoded command 216(1) that corresponds to a user input 114 determined by the remote control device 102. Based on the encoded command 216(1), an infrared blaster device 104 may encode a corresponding command 306(1) within the second infrared signal 108 to cause a receiving device 110 to perform a function associated with the user input 114. As one example, in response to a user input 114 to change a volume of emitted sound by a television, a remote control device 102 may provide a first infrared signal 106 to an infrared blaster device 104. The infrared blaster device 104 may be configured to provide commands to the television that correspond to the inputs to the remote control device 102. In response to the first infrared signal 106, the infrared blaster device 104 may determine a corresponding command 306 that may cause the television, or another type of receiving device 110, to perform a function associated with the user input 114.

While FIG. 3 depicts the command data 206(2) associating a first encoded command 216(1) with a first corresponding command 306(1) and a second encoded command 216(2) with a second corresponding command 306(2), any number of encoded commands 216(N) may be associated with any number of corresponding commands 306(N). Additionally, while FIG. 3 depicts a one-to-one relationship between encoded commands 216 and corresponding commands 306, in other implementations, a single corresponding command 306 may be associated with multiple encoded commands 216. Additionally, in some cases, a single encoded command 216 may be associated with multiple corresponding commands 306. For example, a user input 114 to change a volume of sound may cause infrared signals encoding commands to be provided to multiple audio devices.

At 308, a second time period 116(2) for transmission of the second infrared signal 108 may be determined based on a second portion of the first infrared signal 106. As described with regard to FIG. 2, the infrared blaster device 104 may determine data indicative of the first time period 116(1) based on signal data 210(1) indicative of characteristics of the first infrared signal 106, which may include one or more of device data 212, signal characteristics 214, or time data 218. The signal data 210(1) may be used to determine one or more of a duration of the first time period 116(1), a time at which the first time period 116(1) will elapse, a time at which a second time period 116(2) for transmission of a second infrared signal 108 will begin, a duration of the second time period 116(2), or a time at which the second time period 116(2) will elapse. In some implementations, the infrared blaster device 104 may access time data 218(2) that associates signal data 210 determined from the first infrared signal 106 with time periods 116 for transmission of a second infrared signal 108 by the infrared blaster device 104. For example, FIG. 3 depicts the time data 218(2) associating a first set of signal data 210(1) with a particular time period 116(2), a second set of signal data 210(2) with a different time period 116(4), and any number of additional sets of signal data 210(N) with additional time periods 116(N). In other implementations, the second time period 116(2) for transmission of the second infrared signal 108 may have a fixed or default duration, such as a threshold length of time after receipt of the first infrared signal 106 by the infrared blaster device 104.

At 310, a second infrared signal 108 may be transmitted during the second time period 116(2). The second infrared signal 108 may encode the corresponding command 306(1) associated with the encoded command 216(1) of the first infrared signal 106. In some implementations, the second infrared signal 108 may be provided to a receiving device 110, such as to cause the receiving device 110 to perform a function, change a configuration, present a message, or otherwise store or process received data. In some implementations, after the second time period 116(2) has elapsed, the infrared blaster device 104 may cease transmitting the second infrared signal 108 and withhold transmission of one or more infrared signals to reduce interference with signals transmitted by the remote control device 102.

Figure 4:
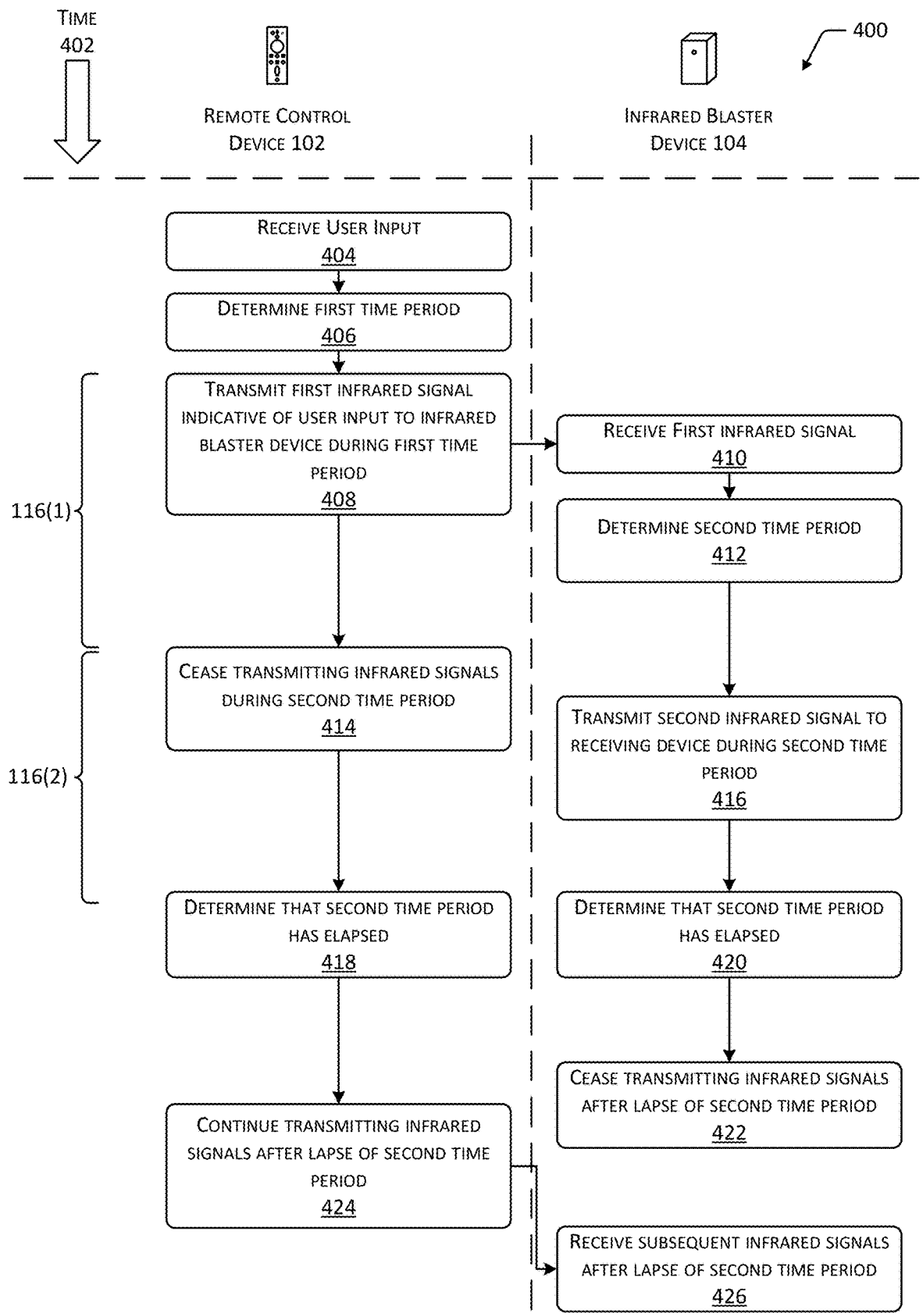
FIG. 4 is a flow diagram illustrating an implementation of a method for controlling transmission of infrared signals between a first device and a second device to reduce interference.

FIG. 4 is a flow diagram 400 illustrating an implementation of a method for controlling transmission of infrared signals between a first device and a second device to reduce interference. As described with regard to FIGS. 1-3, a first device may include a remote control device 102 that provides infrared signals to a second device, which may include an infrared blaster device 104. In response to signals received from the remote control device 102, the infrared blaster device 104 may transmit infrared signals to one or more other devices. The time periods 116 during which the remote control device 102 and infrared blaster device 104 transmit infrared signals may be controlled to prevent interference between signals transmitted by the devices by preventing simultaneous transmission of infrared signals. The passage of time 402 in FIG. 4 is illustrated by the arrow. In FIG. 4, time 402 increases down the page, with events shown at the top of the page occurring before those events shown at the bottom of the page. In other implementations, other sequences of events may be used.

At 404, user input 114 may be received by the remote control device 102. For example, a button or other control of the remote control device 102 may be actuated by a user 112. User input 114 may include a single actuation of a control, such as a single button press, multiple successive actuations, or a continuous actuation, such as by holding a button press.

At 406, the remote control device 102 may determine a first time period 116(1). For example, as described with regard to FIG. 2, the remote control device 102 may access command data 206(1) that associates user inputs 114 with corresponding time periods 116. Continuing the example, a first time period 116(1) having a selected duration may correspond to actuation of a particular button of the remote control device 102, such as a continuous press of a button for controlling the volume of sound emitted by a device. In other implementations, the remote control device 102 may be configured to transmit infrared signals for a first time period 116(1) having a fixed length, and withhold transmission of infrared signals for a subsequent second time period 116(2) having a fixed length.

At 408, the remote control device 102 may transmit a first infrared signal 106 indicative of the user input 114 to the infrared blaster device 104 during the determined first time period 116(1). For example, the remote control device 102 may transmit an infrared signal indicative of an encoded command 216 that corresponds to the user input 114. In some implementations, the first infrared signal 106 may also include one or more of device data 212 indicative of the remote control device 102, time data 218 indicative of the first time period 116(1), and so forth. The first infrared signal 106 may also include one or more signal characteristics 214, such as a particular frequency, pulse width, or other characteristics.

At 410, the infrared blaster device 104 may receive the first infrared signal 106. In some implementations the infrared blaster device 104 may be configured to withhold transmission of one or more infrared signals during the first time period 116(1) to prevent interference with signals from the remote control device 102. As described with regard to FIG. 3, the infrared blaster device 104 may determine the encoded command 216 and other data associated with the first infrared signal 106 and may determine a corresponding command 306 for transmission to one or more other devices.

At 412, the infrared blaster device 104 may also determine when the second time period 116(2) will occur. For example, based on at least a portion of the first infrared signal 106, the infrared blaster device 104 may determine the duration of the first time period 116(1). Continuing the example, the infrared blaster device 104 may access time data 218 that associates the duration of the first time period 116(1) with an identifier of the remote control device 102 or of a device type associated with the remote control device 102. As another example, the time data 218 may associate the duration of the first time period 116(1) with a particular frequency or other signal characteristic 214 of the first infrared signal 106. In other implementations, the first infrared signal 106 may encode data indicative of the duration of the first time period 116(1) or data indicating that transmission of the first infrared signal 106 has ceased. Based on this information, the infrared blaster device 104 may determine when the first time period 116(1) will lapse. In other implementations, the infrared blaster device 104 may determine that the first time period 116(1) has elapsed based on a lack of received signals from the remote control device 102 for at least a threshold length of time.

At 414, the remote control device 102 may cease transmitting infrared signals during the second time period 116(2). For example, after the first time period 116(1) has elapsed, the remote control device 102 may cease transmitting the first infrared signal 106 and withhold transmission of one or more other infrared signals to prevent interference with signals transmitted by the infrared blaster device 104. Continuing the example, the remote control device 102 may be configured to cease transmission of infrared signals for a selected length of time. A microcontroller associated with a clock may be used to determine passage of the selected length of time.

At 416, the infrared blaster device 104 may transmit a second infrared signal 108 to a receiving device 110 during the second time period 116(2). For example, after determining that the first time period 116(1) has elapsed, the infrared blaster device 104 may be configured to transmit infrared signals to other devices. In some implementations, the infrared blaster device 104 may be configured to withhold transmission of infrared signals, such as by adding an indication of one or more infrared signals to a queue, during the first time period 116(1). The infrared blaster device 104 may transmit infrared signals during the second time period 116(2) while the remote control device 102 withholds transmission of infrared signals, until the second time period 116(2) has elapsed.

At 418, the remote control device 102 may determine that the second time period 116(2) has elapsed. In some implementations, the remote control device 102 may be configured to withhold transmission of infrared signals for a second time period 116(2) of a predetermined length. For example, the remote control device 102 may include a microcontroller associated with a clock, which may determine that the predetermined length of time has elapsed.

At 420, the infrared blaster device 104 may determine that the second time period 116(2) has elapsed. For example, based on signal data 210 or the encoded command 216 associated with the received first infrared signal 106, the infrared blaster device 104 may determine one or more of a time at which the second time period 116(2) begins, a time at which the second time period 116(2) ends, or a duration of the second time period 116(2). Based on data from a clock, the infrared blaster device 104 may determine that the second time period 116(2) has elapsed or that a time at which the second time period 116(2) ends has occurred.

After the lapse of the second time period 116(2), the remote control device 102 may resume transmission of infrared signals. For example, a remote control device 102 may transmit an infrared signal encoding a repeat code indicative of a continued button press or actuation of another type of control. At 422, after the second time period 116(2) has elapsed, the infrared blaster device 104 may cease transmission of the second infrared signal 108 and withhold transmission of additional infrared signals.

At 424, the remote control device 102 may continue transmitting infrared signals after the lapse of the second time period 116(2). In some implementations, subsequent infrared signals transmitted by the remote control device 102 may be repeat codes indicating the same or a similar user input 114 associated with the first infrared signal 106. For example, if a user 112 continues to depress a particular button of the remote control device 102 throughout the second time period 116(2), the remote control device 102 may transmit a signal indicative of a repeated command associated with the particular button. However, in other implementations, one or more other user inputs 114 may be received subsequent to the lapse of the second time period 116(2), and one or more other infrared signals may be sent to the infrared blaster device 104.

At 426, the infrared blaster device 104 may receive subsequent infrared signals after the lapse of the second time period 116(2). The remote control device 102 may continue to provide infrared signals to the infrared blaster device 104 until a subsequent time period has elapsed, at which time the infrared blaster device 104 may provide corresponding infrared signals to one or more receiving devices 110.

Figure 5:
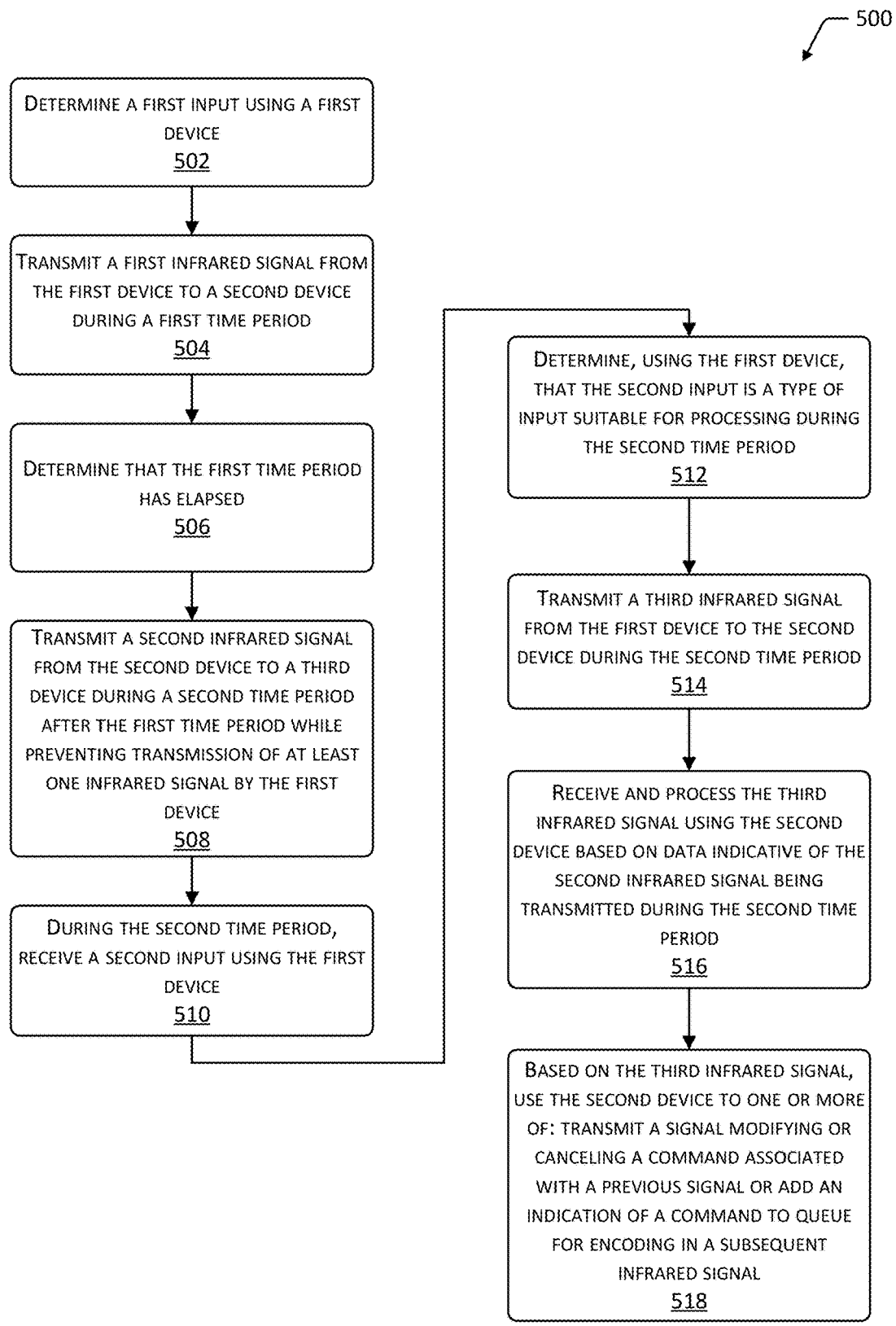
FIG. 5 is a flow diagram illustrating a method for determining particular inputs to a first device that may cancel or modify a previous input or be suitable for addition to a queue and selectively transmitting infrared signals indicative of the inputs to a second device while the second device is transmitting infrared signals.

FIG. 5 is a flow diagram 500 illustrating a method for determining particular inputs to a first device that may cancel or modify a previous input or be suitable for addition to a queue and selectively transmitting infrared signals indicative of the inputs to a second device while the second device is transmitting infrared signals. At 502, a first input may be determined using a first device. For example, a remote control device 102 or another type of device may receive a user input 114, such as actuation of a control, or another type of input, such as a signal from another device. The first device may determine a command or function associated with the input. For example, in response to actuation of a particular control or receipt of a particular command, the first device may be configured to encode a command or other data into an infrared signal for transmission to another device.

At 504 a first infrared signal 106 may be transmitted from the first device to a second device during a first time period 116(1). For example, as described with regard to FIG. 2, the first device may be configured to transmit infrared signals for a first time period 116(1) then cease transmission of the first infrared signal 106 and withhold transmission of one or more other infrared signals during a subsequent time period 116. In some implementations, the durations of the first time period 116(1) and the subsequent time period 116 may be determined based on the particular input that was received. In other implementations, the durations of the time periods 116 may include preselected or default values independent of the input that was received. In some implementations, the second device that receives the first infrared signal 106 may be configured to prevent transmission of infrared signals during the first time period 116(1) to reduce interference with signals received from the first device.

At 506, it may be determined that the first time period 116(1) has elapsed. In some implementations, the first infrared signal 106 may include encoded data indicating that transmission of the first infrared signal 106 has been ceased, such as data indicating an end of a transmission. In other implementations, the first infrared signal 106 may encode time data 218 indicative of a beginning, end, or duration of the first time period 116(1). In such cases, the data encoded in the first infrared signal 106 may be used to determine the end of the first time period 116(1). In other implementations, if the second device does not receive an infrared signal from the first device for at least a threshold length of time after receiving the first infrared signal 106, the passage of the threshold length of time may be used to determine the end of the first time period 116(1). In still other implementations, the command or other payload encoded in the first infrared signal 106 or signal characteristics 214 of the first infrared signal 106 may be used to determine the end of the first time period 116(1). For example, as described with regard to FIG. 3, an infrared blaster device 104 or another type of device may determine a time period 116 for transmission based on signal data 210 (which may include device data 212, signal characteristics 214, an encoded command 216, or time data 218) associated with the first infrared signal 106.

At 508, a second infrared signal 108 may be transmitted from the second device to a third device during a second time period 116(2) that occurs after the first time period 116(1). Transmission of at least one signal by the first device may be withheld during the second time period 116(2) to prevent interference with the second infrared signal 108 transmit by the second device. For example, in response to determining the end of the first time period 116(1) and beginning of the second time period 116(2), the first device may cease transmitting the first infrared signal 106 and prevent or delay transmission of one or more other signals until the second time period 116(2) has elapsed. In response to determining the end of the first time period 116(1), the second device may begin transmitting the second infrared signal 108. In some cases, the second device may be configured to withhold transmission of one or more infrared signals during the first time period 116(1). For example, the second device may delay transmission of the second infrared signal 108 until the first time period 116(1) has elapsed.

At 510, during the second time period 116(2), a second input may be received using the first device. For example, a user 112 may continue to hold or successively tap a button or other control on the first device when the first time period 116(1) elapses, or provide a different user input 114 during the second time period 116(2), such as by actuating another button or other control on the first device. In other cases, the second input may include a signal received from another device, such as a command or another type of data to cause the first device to transmit a subsequent infrared signal. In some cases, the first device may withhold transmission of a subsequent infrared signal during the second time period 116(2), such as by disregarding the second input or adding an indication of the second input or subsequent infrared signal to a queue to be transmitted when the second time period 116(2) elapses. In other cases, the first device may selectively transmit subsequent infrared signals during the second time period 116(2) if a particular input or an input of a particular type is received.

At 512, a determination may be made, using the first device, that the second input is a type of input suitable for processing during the second time period 116(2). For example, the second input may include an input that cancels, modifies, or is related to the first input. Continuing the example, the first input may include actuation of a button to increase a volume of sound associated with an audio device, while the second input may include actuation of a different button to decrease the volume of sound. In such a case, transmission of a subsequent infrared signal indicative of the second input to the second device may be used to cause the second device to cancel or modify a previous input. As another example, the first input may include actuation of a directional button while the second input includes actuation of a different directional button. In such a case, transmission of a subsequent infrared signal indicative of the second input to the second device may be used to enable the second device to generate a queue of commands, such as a series of directional inputs. In cases where the second input is not a type of input suitable for processing during the second time period 116(2), the first device may instead disregard the second input or add an indication of the second input to a queue for transmission after the second time period 116(2) has elapsed.

At 514, a third infrared signal 120 may be transmitted from the first device to the second device during the second time period 116(2). The third infrared signal may include an encoded command 216 or other data associated with the second input. Because the second device may be transmitting the second infrared signal 108 during the second time period 116(2), transmission by the second device may interfere with reception of the third infrared signal 120. However, the second device may access data indicative of the second infrared signal 108 being transmitted and use this data to filter or otherwise account for noise or interference associated with transmission of the second infrared signal 108. As such, at 516, the third infrared signal 120 may be received and processed using the second device based on data indicative of the second infrared signal 108 being transmitted during the second time period 116(2).

At 518, based on the third infrared signal 120, the second device may perform a function. Functions performed by the second device in response to the third infrared signal 120 may include one or more of transmitting a signal modifying or cancelling a command associated with a previous signal or adding an indication of a command to a queue for encoding in a subsequent infrared signal.

Figure 6:
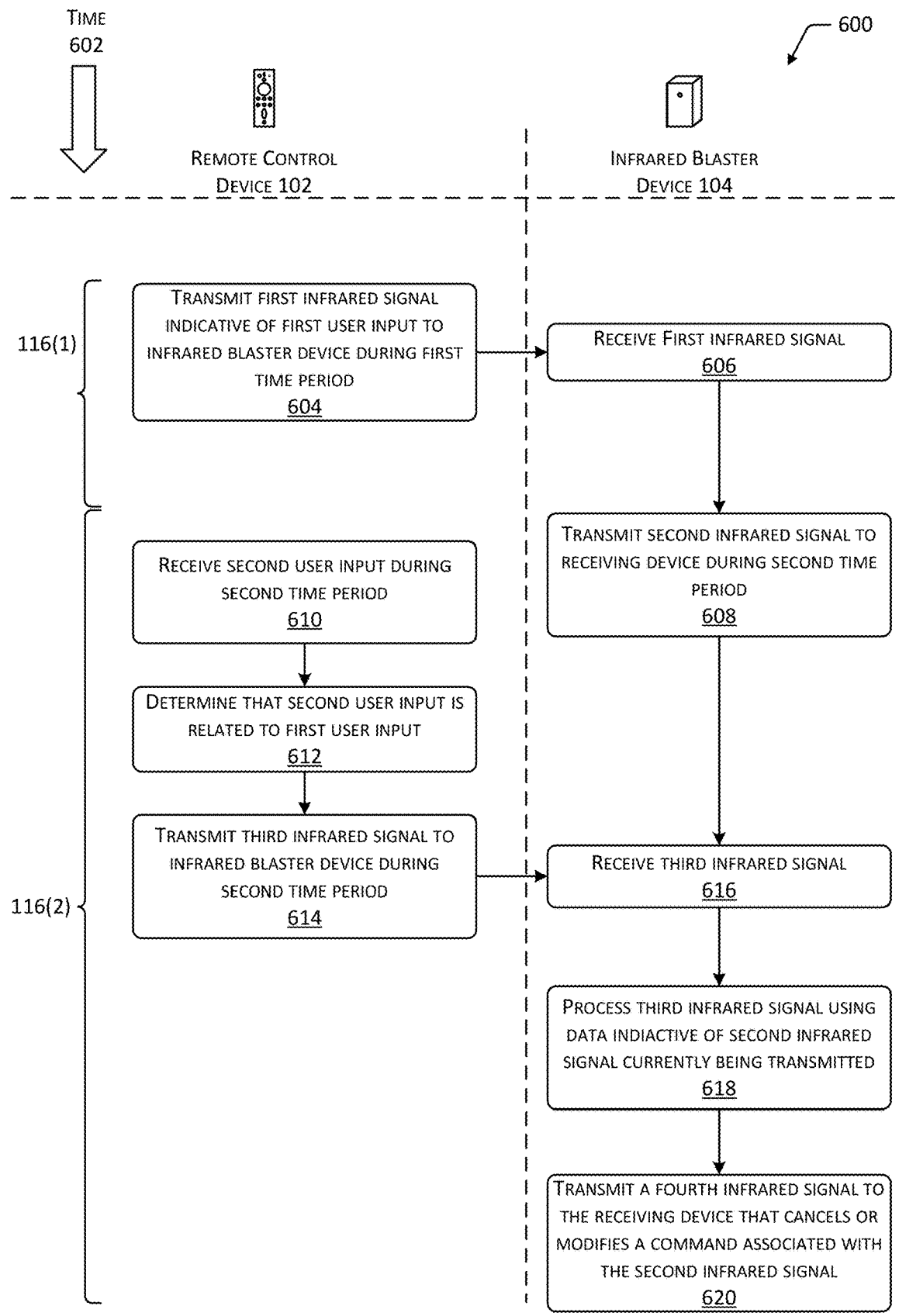
FIG. 6 is a flow diagram illustrating an implementation of a method for determining particular transmissions of infrared signals by a first device to permit during a time period when a second device is transmitting infrared signals to one or more other devices.

FIG. 6 is a flow diagram 600 illustrating an implementation of a method for determining particular transmissions of infrared signals by a first device to permit during a time period when a second device is transmitting infrared signals to one or more other devices. As described with regard to FIGS. 1-5, a first device may include a remote control device 102 that provides infrared signals to a second device, which may include an infrared blaster device 104. In response to signals received from the remote control device 102, the infrared blaster device 104 may transmit infrared signals to one or more other devices. The time periods 116 during which the remote control device 102 and the infrared blaster device 104 transmit infrared signals may be controlled to prevent interference between signals. For example, preventing simultaneous transmission of infrared signals by the devices may reduce interference. However, if the remote control device 102 receives user input 114 during a time period 116 when the remote control device 102 is withholding transmission of infrared signals, and the user input 114 is of a particular type suitable for transmission during the current time period 116, a subsequent infrared signal may be transmitted to the infrared blaster device 104. The passage of time 602 in FIG. 6 is illustrated by the arrow.

At 604, the remote control device 102 may transmit a first infrared signal 106 indicative of first user input 114 to an infrared blaster device 104 during a first time period 116(1). As described with regard to FIGS. 1-5, the remote control device 102 may receive user input 114, generate a first infrared signal 106 indicative of an encoded command 216 associated with the user input 114, and transmit the first infrared signal 106 during the first time period 116(1). The remote control device 102 may cease transmission of the first infrared signal 106 and withhold transmission of one or more other infrared signals during a second time period 116(2) after the first time period 116(1) has elapsed.

At 606, the infrared blaster device 104 may receive the first infrared signal 106. The infrared blaster device 104 may determine the encoded command 216 associated with the first infrared signal 106 and generate a second infrared signal 108 indicative of a corresponding command 306 associated with the encoded command 216. During the first time period 116(1), the infrared blaster device 104 may withhold transmission of one or more infrared signals. After the first time period has elapsed 116(1), at 608, the infrared blaster device 104 may transmit a second infrared signal 108 to a receiving device 110 during the second time period 116(2).

At 610, the remote control device 102 may receive a second user input 114 during the second time period 116(2). In some cases, the remote control device 102 may withhold transmission of infrared signals associated with the second user input 114 during the second time period 116(2) to prevent interference with signals transmitted by the infrared blaster device 104. However, at 612, the remote control device 102 may determine that the second user input 114 is related to the first user input 114. For example, the second user input 114 may include actuation of a control to cancel or modify a command associated with a previous user input, or a command that is suitable for addition to a queue subsequent to performance of a function associated with the first user input 114. In other implementations, the second user input 114 may include a type of input suitable for processing during the second time period 116(2) independent of a relationship between the second user input 114 and the first user input 114.

At 614, the remote control device 102 may transmit a third infrared signal to the infrared blaster device 104 during the second time period 116(2). At 616, the infrared blaster device 104 may receive the third infrared signal 120. However, during the second time period 116(2), the infrared blaster device 104 may be transmitting the second infrared signal 108, which may create interference or otherwise hinder proper reception and processing of the third infrared signal 120. In other implementations, the remote control device 102 may delay transmission of the third infrared signal 120 until after the second time period 116(2) has elapsed.

At 618, the infrared blaster device 104 may process the third infrared signal 120 using data indicative of the second infrared signal 108 currently being transmitted by the infrared blaster device 104. For example, the infrared blaster device 104 may access filter data indicative of infrared signals that are transmitted by the infrared blaster device 104. The filter data may be used to account for noise or interference if a subsequent signal is received from the remote control device 102 or another device during the second time period 116(2) during which the infrared blaster device 104 is transmitting an infrared signal. For example, if an infrared signal is received from the remote control device 102 or another device while the infrared blaster device 104 is transmitting an infrared signal, the signal being transmitted by the infrared blaster device 104 may prevent receipt and processing of the signal from the remote control device 102. The filter data indicative of the signal being transmitted may be used to differentiate the received signal from the signal being transmitted, enabling the received signal to be processed by the infrared blaster device 104. Based on the third infrared signal 120, at 620, the infrared blaster device 104 may transmit a fourth infrared signal 122 to the receiving device 110 that cancels or modifies a command associated with the second infrared signal 108.

Figure 7:
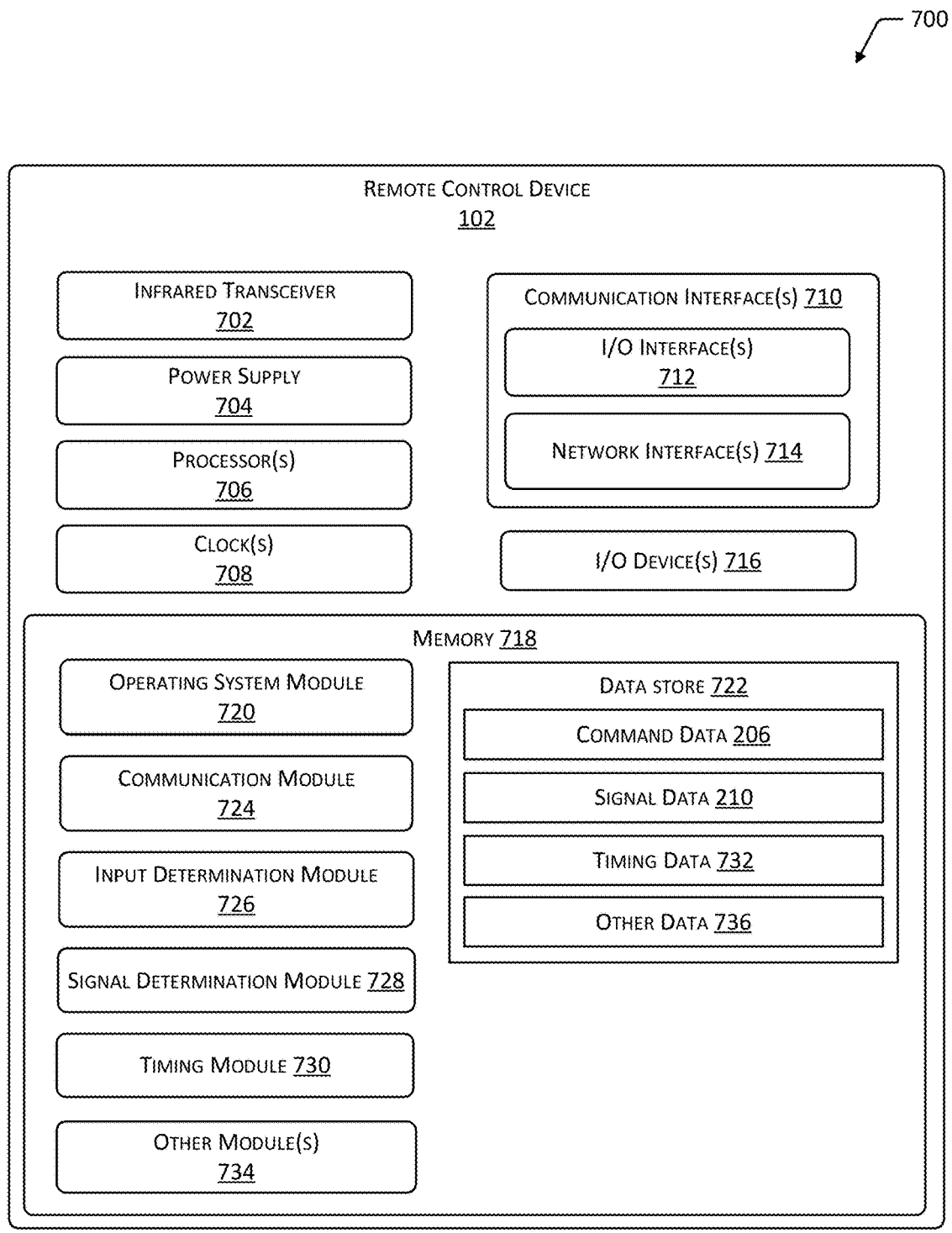
FIG. 7 is a block diagram illustrating an implementation of a remote control device or other type of computing device that transmits infrared signals to a second device, such as an infrared blaster device.

FIG. 7 is a block diagram 700 illustrating an implementation of a remote control device 102 or another type of computing device that transmits infrared signals to a second device, such as an infrared blaster device 104. While FIG. 7 depicts a single block diagram 700 representing the remote control device 102, any number and any type of computing devices may be used to perform the functions described herein. For example, while FIGS. 1-6 depict implementations of interactions between a remote control device 102 and other devices, in other implementations, the remote control device 102 may communicate with a server or other computing device, which may cause the remote control device 102 to perform functions in response to data received by the remote control device 102 or the other computing device. The remote control device 102 may include an infrared transceiver 702 for emission of infrared signals for receipt by other devices, such as an infrared blaster device 104. In some implementations, the infrared transceiver 702 may be used to receive one or more infrared signals.

One or more power supplies 704 may be configured to provide electrical power suitable for operating the components of the remote control device 102. In some implementations, the power supply 704 may include a rechargeable battery, fuel cell, photovoltaic cell, power conditioning circuitry, and so forth.

The remote control device 102 may include one or more hardware processor(s) (processors) 706 configured to execute one or more stored instructions. The processor(s) 706 may include one or more cores. In some cases, the processor(s) 706 may include a microcontroller, system-on-a-chip (SoC), or other types of hardware or software components that may execute the stored instructions.

One or more clock(s) 708 may provide information indicative of date, time, ticks, and so forth. For example, the processor(s) 706 may use data from the clock 708 to generate a timestamp, trigger a preprogrammed action, and so forth. Continuing the example, the clock 708 may be used to determine when particular time periods for transmission of infrared signals and prevention of transmission of infrared signals begin and end.

The remote control device 102 may include one or more communication interfaces 710, such as input/output (I/O) interfaces 712, network interfaces 714, and so forth. The communication interfaces 710 may enable the remote control device 102 to communicate with other computing devices such as the infrared blaster device 104. The I/O interfaces 712 may include interfaces such as Inter-Integrated Circuit (I2C), Serial Peripheral Interface bus (SPI), Universal Serial Bus (USB) as promulgated by the USB Implementers Forum, RS-232, and so forth. As described with regard to FIGS. 1-4, the communication interfaces 710 may be configured to communicate using infrared signals, such as by encoding commands or other data within the infrared signals emitted by the infrared transceiver 702 and determining the encoded data within received infrared signals.

The I/O interface(s) 712 may couple to one or more I/O devices 716. The I/O devices 716 may include any manner of input devices or output devices associated with the remote control device 102. For example, the I/O devices 716 may include buttons, lights, touch sensors, displays, touch sensors integrated with displays (e.g., touchscreen displays), keyboards, mouse devices, microphones, image sensors, cameras, scanners, speakers, haptic devices, printers, and so forth. In some implementations, the I/O devices 716 may be physically incorporated with the remote control device 102. In other implementations, I/O devices 716 may be externally placed. For example, the remote control device 102 may include one or more buttons or other controls incorporated within that may be manually actuated by a user 112.

The network interfaces 714 may be configured to provide communications between the remote control device 102 and other devices, such as the I/O devices 716, routers, access points, and so forth. The network interfaces 714 may include devices configured to couple to one or more networks including local area networks (LANs), wireless LANs (WLANs), wide area networks (WANs), wireless WANs, and so forth. For example, the network interfaces 714 may include devices compatible with Ethernet, Wi-Fi, Bluetooth, ZigBee, Z-Wave, 3G, 4G, 5G, LTE, and so forth.

The remote control device 102 may include one or more buses or other internal communications hardware or software that allows for the transfer of data between the various modules and components of the remote control device 102.

As shown in FIG. 7, the remote control device 102 may include one or more memories 718. The memory 718 may include one or more computer-readable storage media (CRSM). The CRSM may be any one or more of an electronic storage medium, a magnetic storage medium, an optical storage medium, a quantum storage medium, a mechanical computer storage medium, and so forth. The memory 718 may provide storage of computer-readable instructions, data structures, program modules, and other data for the operation of the remote control device. A few example modules are shown stored in the memory 718, although the same functionality may alternatively be implemented in hardware, firmware, or as a system on a chip (SoC).

The memory 718 may include one or more operating system (OS) modules 720. The OS module 720 may be configured to manage hardware resource devices such as the I/O interfaces 712, the network interfaces 714, the I/O devices 716, and to provide various services to applications or modules executing on the processors 706. The OS module 720 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 722 and one or more of the following modules may also be associated with the memory 718. The modules may be executed as foreground applications, background tasks, daemons, and so forth. The data store(s) 722 may use a flat file, database, linked list, tree, executable code, script, or other data structure to store information. In some implementations, the data store(s) 722 or a portion of the data store(s) 722 may be distributed across one or more other devices including other computing devices, network attached storage devices, and so forth.

A communication module 724 may be configured to establish communications with one or more other devices. Communications may be authenticated, encrypted, and so forth. As described previously, communications may include use of infrared signals.

The memory 718 may also store an input determination module 726. The input determination module 726 may determine actuation of a button, control, or other input device by a user 112, receipt of a signal or other type of communication from another computing device, and so forth. The input determination module 726 may generate data indicative of the input or may provide at least a portion of the data received from another device to one or more other modules in the memory 718.

The memory 718 may additionally store a signal determination module 728. The signal determination module 728 may determine an infrared signal to be generated in response to a received input. For example, the signal determination module 728 may access command data 206 that associates user inputs 114 or other types of inputs with corresponding data to be encoded within an infrared signal. The command data 206 may also associate inputs with time periods 116 for transmission of the infrared signal, and with signal data 210 indicative of one or more characteristics of the signal to be transmitted. The signal determination module 728 may generate an infrared signal based on the received input or may cause another module of the remote control device 102 to generate the infrared signal. The signal determination module 728 or other module of the remote control device 102 may access signal data 210 indicative of data to be encoded within the infrared signal, characteristics of the infrared signal, and so forth. For example, as described with regard to FIGS. 2 and 3, signal data 210 may include device data 212 indicative of one or more characteristics of the remote control device 102, signal characteristics 214 such as a frequency or pulse width of the transmitted signal, one or more encoded commands 216 or other types of communications or payloads, and in some cases, time data 218 indicative of a time period for transmission of the infrared signal.

The memory 718 may store a timing module 730, which may control times at which the remote control device 102 transmits infrared signals and times at which transmission of infrared signals is prevented. For example, the timing module 730 may access timing data 732 indicative of determined time periods for transmission or prevention of transmission of infrared signals. Based on data from the clock 708 and the timing data 732, the timing module 730 may permit or withhold transmission of infrared signals by the remote control device 102. In some implementations, one or more of the command data 206 or timing data 732 may indicate particular inputs, types of input, infrared signals, or characteristics of infrared signals that may be transmitted independent of whether one or more time periods 116 have elapsed. For example, as described with regard to FIG. 5, if a particular type of input is received during a time period 116 during which transmission of infrared signals by the remote control device 102 is to be withheld, an infrared signal indicative of the received input may be provided to another device independent of the time period 116.

Other modules 734 may also be present in the memory 718. For example, other modules 734 may include modules for configuring or programming the remote control device 102, modules for determining characteristics of other devices, such as a computing device to receive infrared signals, encryption modules to encrypt and decrypt communications between computing devices, authentication modules to authenticate communications sent or received by computing devices, administrative modules to assign, determine, and manage user permissions to access or modify data associated with computing devices, and so forth.

Other data 736 within the data store(s) 722 may include configurations, settings, preferences, and default values associated with the remote control device 102. Other data 736 may also include encryption keys and schema, access credentials, and so forth.

In different implementations, different computing devices may have different capabilities or capacities. For example, infrared blaster devices 104 may have greater processing capabilities or data storage capacity than remote control devices 102.

Figure 8:
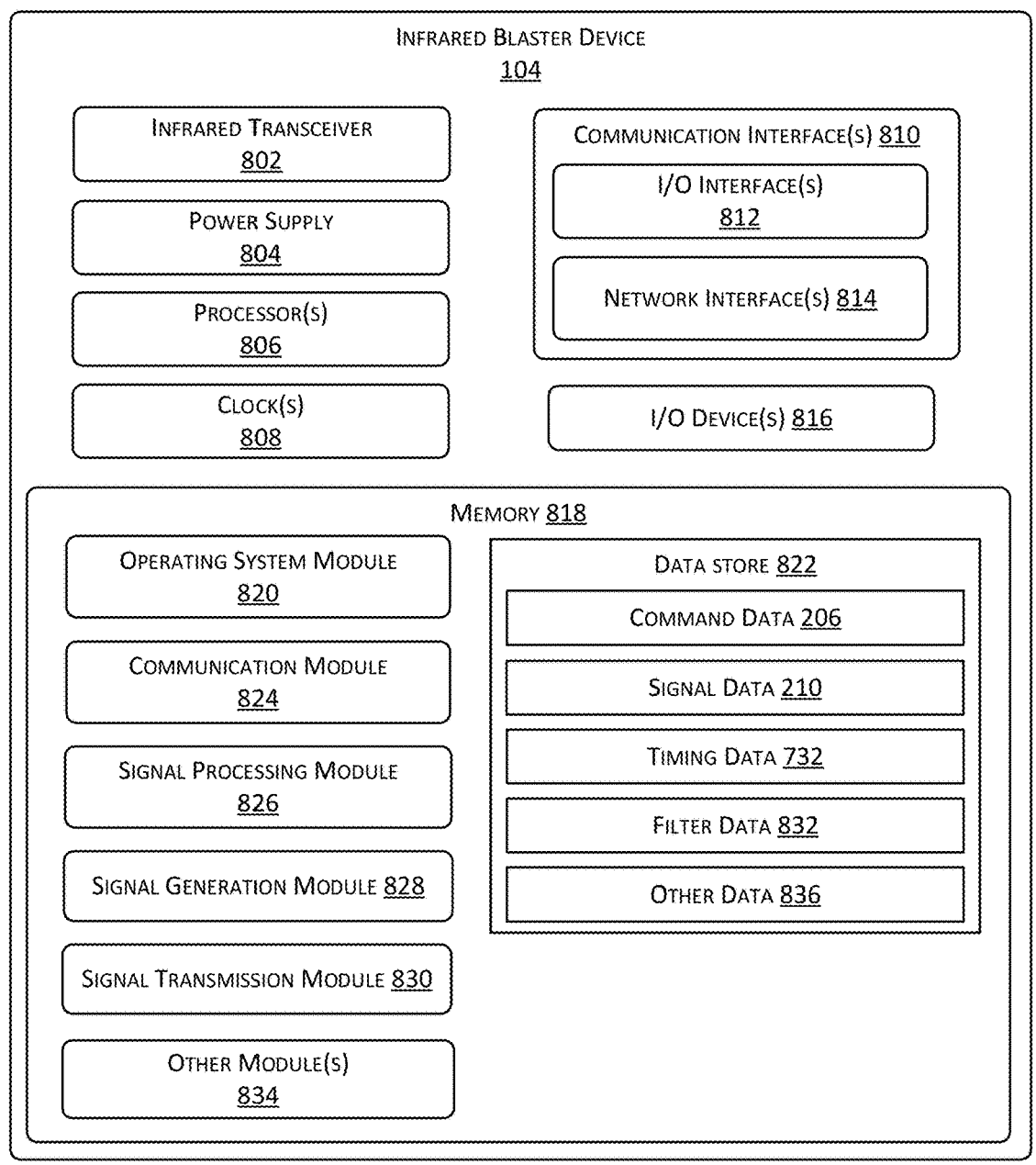
FIG. 8 is a block diagram illustrating an implementation of an infrared blaster device or other type of computing device that receives infrared signals from a first device, such as a remote control device, and transmits infrared signals to one or more other devices.

FIG. 8 is a block diagram 800 illustrating an implementation of an infrared blaster device 104 or other type of computing device that receives infrared signals from a first device, such as a remote control device 102, and transmits infrared signals to one or more other devices. While FIG. 8 depicts a single block diagram 800 representing the infrared blaster device 104, any number and any type of computing devices may be used to perform the functions described herein. For example, while FIGS. 1-6 depict implementations of interactions between an infrared blaster device 104 and other devices, in other implementations, the infrared blaster device 104 may communicate with a server or other computing device, which may cause the infrared blaster device 104 to perform functions in response to data received by the infrared blaster device 104 or the other computing device. Continuing the example, the infrared blaster device 104 may provide data indicative of a received infrared signal to a server, which may provide data indicative of an infrared signal to be generated to the infrared blaster device 104. The infrared blaster device 104 may include an infrared transceiver 802 for receipt of infrared signals from other devices, such as a remote control device 102, and emission of infrared signals for receipt by other devices, such as receiving devices 110.

The infrared blaster device 104 may include one or more power supplies 804, hardware processors 806, clocks 808, communication interfaces 810 such as input/output (I/O) interfaces 812 and network interfaces 814, and I/O devices 816. These components may include, without limitation, the same types of components described with regard to the remote control device 102 of FIG. 7. For example, the infrared blaster device 104 may be configured to receive infrared signals from the remote control device 102 and transmit other infrared signals to other devices. Data from the clock(s) 808 may be used to determine when particular time periods 116 for transmission of infrared signals begin and end to reduce interference with infrared signals from the remote control device 102.

The infrared blaster device 104 may include one or more memories 818 that may provide storage of computer-readable instructions, data structures, program modules, and other data for the operation of the infrared blaster device 104. Example modules are shown stored in the memory 818, although the same functionality may alternatively be implemented in hardware, firmware, or as a system on a chip (SoC).

The memory 818 may include one or more operating system (OS) modules 820 configured to manage hardware resource devices such as the I/O interfaces 812, the network interfaces 814, the I/O devices 816, and to provide various services to applications or modules executing on the processors 806.

One or more data stores 822 and one or more of the following modules may also be associated with the memory 818. The modules may be executed as foreground applications, background tasks, daemons, and so forth. The data store(s) 822 may use a flat file, database, linked list, tree, executable code, script, or other data structure to store information. In some implementations, the data store(s) 822 or a portion of the data store(s) 822 may be distributed across one or more other devices including other computing devices, network attached storage devices, and so forth.

A communication module 824 may be configured to establish communications with one or more other devices. Communications may be authenticated, encrypted, and so forth. As described previously, communications may include use of infrared signals.

The memory 818 may also store a signal processing module 826. The signal processing module 826 may receive infrared signals or other types of inputs from other devices and generate data indicative of the input or may provide at least a portion of the data received from another device to one or more other modules in the memory 818.

The memory 818 may additionally store a signal generation module 828. The signal generation module 828 may determine an infrared signal to be generated in response to a received input. For example, the signal generation module 828 may access command data 206 that associates an encoded command 216, or other data encoded in a received infrared signal, with a corresponding command 306, or other data to be provided to other devices in a transmitted infrared signal. In some implementations, the command data 206 may also associate inputs with time periods 116 for transmission of the infrared signal, and with signal data 210 indicative of one or more characteristics of the signal to be transmitted. The signal generation module 828 may generate an infrared signal based on the received input or may cause another module of the infrared blaster device 104 to generate the infrared signal. The signal generation module 828 or other module of the infrared blaster device 104 may access signal data 210 indicative of data to be encoded within the infrared signal, characteristics of the infrared signal, and so forth.

The memory 818 may store a signal transmission module 830, which may control the times at which the infrared blaster device 104 transmits infrared signals. For example, the signal transmission module 830 may access timing data 732 indicative of determined time periods 116 for transmission or prevention of transmission of infrared signals by a remote control device 102 or other device from which an infrared signal was received. Based on data from the clock(s) 808 and the timing data 732, the signal transmission module 830 may determine a time for transmission of an infrared signal to another device.

In some implementations, the infrared blaster device 104 may store filter data 832 indicative of infrared signals that are transmitted by the infrared blaster device 104. The filter data 832 may be used to account for noise or interference if a subsequent signal is received from the remote control device 102 or another device during a time period 116 when the infrared blaster device 104 is transmitting a signal. For example, if an infrared signal is received from the remote control device 102 or another device while the infrared blaster device 104 is transmitting an infrared signal, the signal being transmitted by the infrared blaster device 104 may prevent receipt and processing of the signal from the remote control device 102. The filter data 832 indicative of the signal being transmitted may be used to differentiate the received signal from the signal being transmitted, enabling the received signal to be processed by the infrared blaster device 104.

Other modules 834 may also be present in the memory 818. For example, other modules 834 may include modules for configuring or programming the infrared blaster device 104, such as configuring the infrared blaster device 104 to provide infrared signals to particular types of other devices. Other modules 834 may include modules for determining characteristics of other devices, encryption modules to encrypt and decrypt communications between computing devices, authentication modules to authenticate communications sent or received by computing devices, administrative modules to assign, determine, and manage user permissions to access or modify data associated with computing devices, and so forth.

Other data 836 within the data store(s) 822 may include configurations, settings, preferences, and default values associated with the infrared blaster device 104. Other data 836 may also include encryption keys and schema, access credentials, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   a remote control device comprising:
      one or more first memories storing first computer-executable instructions; and
      one or more first hardware processors to execute the first computer-executable instructions to:
         determine actuation of a first button of the remote control device;
         during a first time period, transmit a first infrared signal indicative of the actuation of the first button; and
         during a second time period after the first time period, withhold transmission of at least one infrared signal; and
   an infrared device comprising:
      one or more second memories storing second computer-executable instructions; and
      one or more second hardware processors to execute the second computer-executable instructions to:
         receive the first infrared signal from the remote control device;
         determine, based on a first portion of the first infrared signal, that the first infrared signal was emitted by the remote control device;
         determine that a second portion of the first infrared signal is indicative of the actuation of the first button;
         in response to one or more of the first infrared signal being emitted by the remote control device or the first infrared signal being indicative of the actuation of the first button, determine a length of the first time period;
         determine a second infrared signal that corresponds to the actuation of the first button;
         determine, based on the length of the first time period, that the first time period has elapsed; and
         during the second time period, transmit the second infrared signal to a receiving device to cause the receiving device to perform a function associated with the actuation of the first button.

2. The system of claim 1, wherein the remote control device further comprises first computer-executable instructions to:
   during the second time period, determine an input including one or more of: actuation of a second button of the remote control device, a second actuation of the first button, or a release of the first button;
   determine an association between the input and data indicative of inputs to be transmitted during the second time period; and
   during the second time period, transmit a third infrared signal to the infrared device; and
wherein the infrared device further comprises second computer-executable instructions to:

receive the third infrared signal during transmission of the second infrared signal;
based on data indicative of the second infrared signal, determine receipt of the third infrared signal during the second time period;
determine a fourth infrared signal that corresponds to the input; and
transmit the fourth infrared signal to the receiving device.

3. The system of claim 1, wherein the infrared device further comprises second computer-executable instructions to:
determine that the second time period has elapsed;
determine a lack of receipt of a third infrared signal indicative of actuation of the first button after the second time period has elapsed; and
one or more of: cease transmission of the second infrared signal to the receiving device or transmit a fourth infrared signal indicative of release of the first button to the receiving device.

4. A system comprising:
a first device comprising:
one or more first memories storing first computer-executable instructions; and
one or more first hardware processors to execute the first computer-executable instructions to:
during a first time period, receive a first infrared signal from a second device;
determine, based on one or more characteristics of the first infrared signal, one or more of a length of the first time period or a time that the first time period will elapse;
determine a second infrared signal that corresponds to the first infrared signal;
determine that the first time period has elapsed; and
in response to determining that the first time period has elapsed, during a second time period after the first time period, transmit the second infrared signal to a third device.

5. The system of claim 4, wherein the first computer-executable instructions to determine that the first time period has elapsed include first computer-executable instructions to determine a lack of receipt of infrared signals from the second device for at least a threshold length of time.

6. The system of claim 4, wherein the first computer-executable instructions to determine the one or more of the length of the first time period or the time that the first time period will elapse include first computer-executable instructions to:
determine data encoded by the first infrared signal; and
determine the one or more of the length of the first time period or the time that the first time period will elapse based in part on the data encoded by the first infrared signal.

7. The system of claim 4, wherein the first computer-executable instructions to determine the second infrared signal that corresponds to the first infrared signal include first computer-executable instructions to:
determine an input represented by at least a portion of the first infrared signal;
determine a command based on device data for the third device, wherein the device data associates the input with the command; and
determine that the second infrared signal is associated with causing the third device to perform a function associated with the command.

8. The system of claim 4, wherein the second device is configured to cease transmission of at least one type of infrared signal during the second time period to reduce interference associated with the second infrared signal.

9. The system of claim 4, further comprising first computer-executable instructions to:
during the second time period, receive a third infrared signal from the second device;
filter a first portion of the third infrared signal based on data indicative of the second infrared signal;
determine receipt of a second portion of the third infrared signal during the second time period; and
in response to the second portion of the third infrared signal, one or more of: transmit a fourth infrared signal to the third device or cease transmission of the second infrared signal.

10. The system of claim 4, further comprising first computer-executable instructions to:
during the second time period, receive a third infrared signal from the second device;
filter a first portion of the third infrared signal based on data indicative of the second infrared signal;
determine receipt of a second portion of the third infrared signal during the second time period;
determine a fourth infrared signal that corresponds to the second portion of the third infrared signal;
store an indication of the fourth infrared signal in a queue; and
transmit the fourth infrared signal to the third device after transmitting the second infrared signal.

11. The system of claim 4, further comprising first computer-executable instructions to:
determine that the second time period has elapsed;
determine a lack of receipt of one or more of the first infrared signal or a third infrared signal from the second device after the second time period has elapsed; and
one or more of: cease transmission of the second infrared signal to the third device or transmit a fourth infrared signal that corresponds to the lack of receipt to the third device.

12. The system of claim 4, wherein the second device comprises:
one or more second memories storing second computer-executable instructions; and
one or more second hardware processors to execute the second computer-executable instructions to:
determine an input to a control associated with the second device;
generate the first infrared signal in response to the input;
during the first time period, transmit the first infrared signal to the first device;
determine that the first time period has elapsed; and
in response to determining that the first time period has elapsed, prevent transmission of at least one infrared signal during the second time period,
and wherein the first device further comprises first computer-executable instructions to:
determine, based on at least a portion of the first infrared signal, that the first infrared signal was received from the second device; and
determine the first time period based on the at least a portion of the first infrared signal.

13. A system comprising:
a first device comprising:
one or more first memories storing first computer-executable instructions; and one or more first hardware processors to execute the first computer-executable instructions to:
determine a first input associated with a first control;
determine a first signal that corresponds to the first input;
determine a first time period based on one or more of the first input or one or more characteristics of the first signal;
during the first time period, transmit the first signal to a second device;
determine that the first time period has elapsed; and
in response to determining that the first time period has elapsed, withhold transmission of at least one signal during a second time period after the first time period, wherein during at least a portion of the second time period, the second device transmits a second signal.

14. The system of claim 13, further comprising first computer-executable instructions to:
during the second time period, determine a second input associated with one or more of: actuation of the first control, cessation of actuation of the first control, or actuation of a second control;
determine correspondence between the second input and command data that associates the second input with the second time period; and
in response to the correspondence between the second input and the command data, during the second time period, transmit a third signal indicative of the second input to the second device.

15. The system of claim 13, further comprising first computer-executable instructions to:
during the second time period, determine a second input associated with one or more of: actuation of the first control, cessation of actuation of the first control, or actuation of a second control;
determine a lack of correspondence between the second input and command data that associates types of inputs with transmission during the second time period;
determine that the second time period has elapsed; and
during a third time period after the second time period, transmit a third signal indicative of the second input to the second device.

16. The system of claim 15, further comprising first computer-executable instructions to:

in response to the lack of correspondence, add an indication of the third signal to a queue; and
in response to determining that the second time period has elapsed, determine the indication of the third signal in the queue, wherein the third signal is transmitted in response to the indication of the third signal in the queue.

17. The system of claim 13, wherein:
the first signal includes one or more of an infrared signal, an optical signal, or an acoustic signal,
the first signal is transmitted using a communication protocol associated with transmission during the first time period and cessation of transmission during a third time period after the first time period,
and a duration of the second time period is greater than or equal to a duration of the third time period.

18. The system of claim 13, wherein a duration of the second time period is greater than or equal to a duration associated with transmission of the second signal by the second device.

19. The system of claim 13, further comprising first computer-executable instructions to:
determine correspondence between the first input and command data that associates the first input with the second time period;
wherein withholding transmission of the at least one signal is further in response to the correspondence.

20. The system of claim 13, wherein the second device comprises:
one or more second memories storing second computer-executable instructions; and
one or more second hardware processors to execute the second computer-executable instructions to:
during the first time period, receive the first signal from the first device;
determine that the second signal corresponds to the first signal;
determine the first time period based on at least a portion of the first signal;
determine that the first time period has elapsed; and
in response to determining that the first time period has elapsed, transmit the second signal during the second time period.

* * * * *